UNITED STATES PATENT OFFICE.

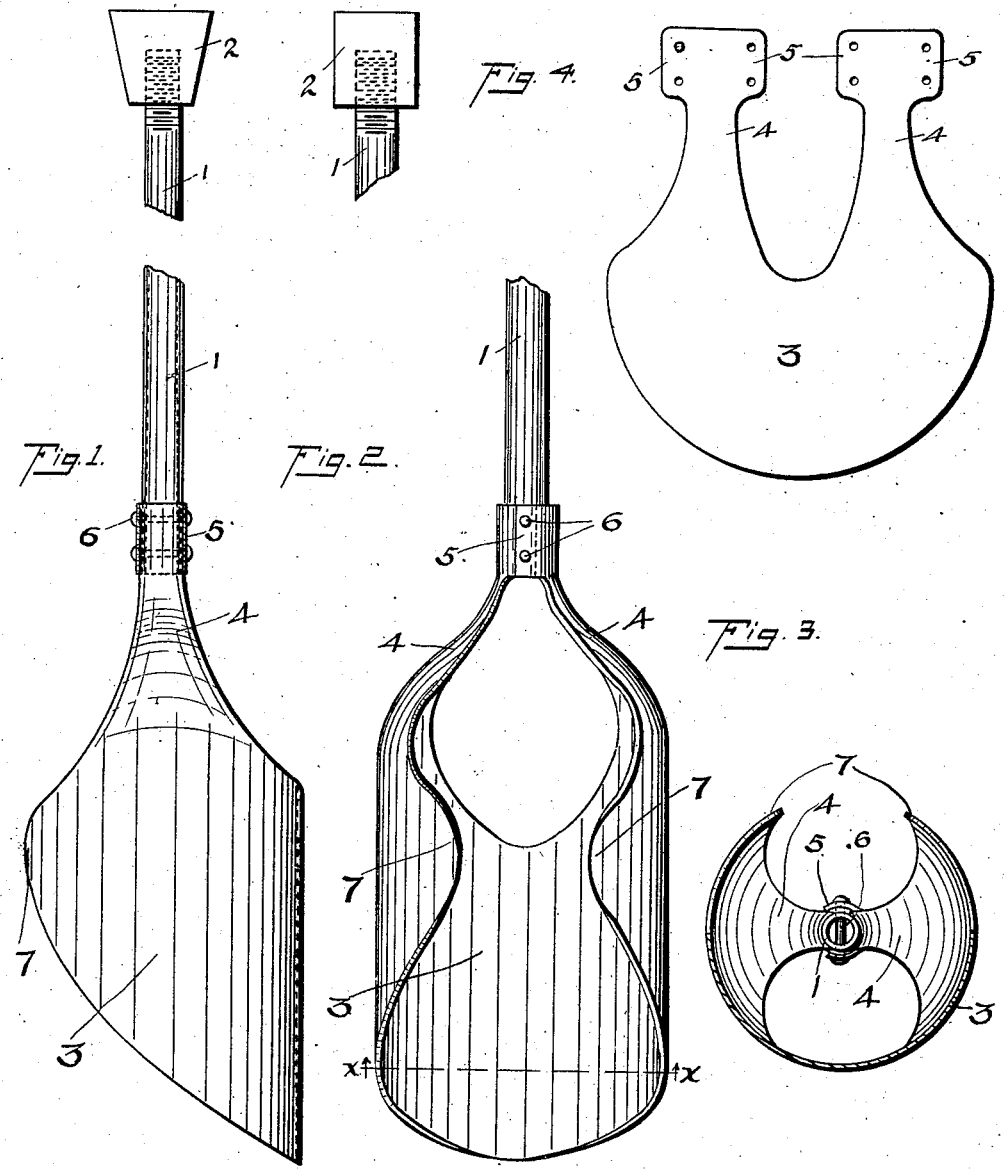

GEORGE W. ZWIEBEL, OF PAPILLION, NEBRASKA.

POST-HOLE DIGGER.

No. 849,957.      Specification of Letters Patent.      Patented April 9, 1907.

Application filed June 26, 1906. Serial No. 323,526.

*To all whom it may concern:*

Be it known that I, GEORGE W. ZWIEBEL, a citizen of the United States, and a resident of Papillion, in the county of Sarpy and State of Nebraska, have invented certain new and useful Improvements in Post-Hole Diggers, of which the following is a specification.

My invention relates to implements for digging post-holes or making similar excavations; and it is the object thereof to provide a simple, efficient, and cheaply-constructed digger without working parts, as in the pivoted-jaw diggers, and from which the earth may be readily removed and will not stick therein, as in the closed-cylinder type of diggers.

A further object is to provide a construction by which the same implement may be used also as a shovel for filling the holes and for tamping the earth into the same.

A construction embodying my invention is shown in the accompanying drawings, in which—

Figure 1 is a side elevation of the digger, a portion of the handle being broken away. Fig. 2 is a front elevation of the same. Fig. 3 is a sectional view on the line $x\,x$ of Fig. 2, and Fig. 4 is a developed plan view of the sheet-metal blank from which the shovel portion of the implement is formed.

The device as shown consists, essentially, of a handle 1, preferably made of ordinary pipe, a head 2, carried on the upper end of the handle, and a shovel of special form secured to the lower end of the handle. The shovel is formed from a plate of sheet metal of suitable thickness, of which the main body 3 is of approximately semicircular form and has extending from the upper edge thereof the tapering tongues 4, each of which has at the end the lugs 5 on the sides thereof, as shown in Fig. 4. In forming the shovel from the sheet-metal blank the same is bent transversely to a cylindrical form of such diameter that the tongues 4 will be on opposite sides thereof, and said tongues are bent inwardly, as over an approximately conical surface, the ends of the tongues and the lugs 5 being formed around the pipe 1 and the overlapping portions of the said lugs being secured by rivets 6, passing through the pipe. Near the upper end of the shovel-body 3 the same approaches a complete cylindrical form, the width of the longitudinal opening between the points 7 being only about one-third of the whole diameter of the cylinder, as shown in Fig. 2. From this point of greatest inclosure to the lower end of the shovel the amount of inclosure becomes gradually less, being just a half-circle at the line $x\,x$. The extent of the point of the shovel below the line $x\,x$ is such that in earth of ordinary firmness the said point of the shovel can be forced thereinto as far as or farther than to the said line $x\,x$, so that the earth cut will be sufficiently inclosed by the shovel to stick therein.

In using the implement the same is forced straight down into the ground, so that the hard earth cut thereby will wedge in the lower part of the shovel, while the loose earth will be carried above the same in the more nearly inclosed upper part of the shovel. After removal of the earth from the hole the same may be readily loosened and discharged from the shovel by the user passing his foot through the longitudinal opening, the incomplete inclosure of the hard earth making it easy to loosen from the shovel.

It will be obvious that the shovel may be readily used for filling the holes after the posts have been set therein, the tamping-head 2 on the upper end of the handle 1 enabling the same implement to be used for tamping the earth in the hole. The proportions of the implement are made such that the weight thereof will be sufficient to make it easily driven in the ground, but without being heavy enough to be inconvenient or clumsy in handling.

Now, having described my invention, what I claim, and desire to secure by Letters Patent of the United States, is—

1. A post-hole digger comprising a shovel portion of which the main body is in the form of a cylinder having a longitudinal opening in one side thereof, the said opening being relatively small at the upper part of the shovel-body but gradually increasing toward the lower end thereof, the inclosure from a point adjacent the lower edge of the shovel-body being less than a half-circle, and tongues integral with the shovel-body and extending upwardly therefrom to connect with a handle.

2. A post-hole digger comprising a handle, and a shovel-body connected therewith and consisting of a cylindrically-formed plate of such outline that the upper part thereof will inclose less than a complete circle and more than a half-circle, the amount of inclosure gradually decreasing therefrom to the lower edge of the shovel-body, and the inclosure only being less than a half-circle from a horizontal line adjacent the lowest point of the shovel-body.

3. A post-hole digger comprising a handle, a shovel-body consisting of a transversely-bent plate of a form such that the upper part thereof will inclose nearly a complete cylinder, the amount of inclosure gradually decreasing therefrom to the lower edge of the shovel-body, tongues integral with the shovel-body and extending upwardly and inwardly therefrom as over an approximately conical surface, and means connecting said tongues with the handle.

In testimony whereof I have hereunto subscribed my name in the presence of two witnesses.

GEORGE W. ZWIEBEL.

Witnesses:
LOUIS LESIEUR,
WENDEL MEGEL